(12) United States Patent
Tops

(10) Patent No.: US 6,906,297 B2
(45) Date of Patent: Jun. 14, 2005

(54) METHOD AND DEVICE FOR MICROWAVE-HEATING PREPARED MEALS SEALED IN TRAYS

(75) Inventor: Rudy Tops, Westerlo (BE)

(73) Assignee: Tops Foods, N.V., Olen (BE)

( * ) Notice: Subject to any disclaimer, the term of this patent is extended or adjusted under 35 U.S.C. 154(b) by 0 days.

(21) Appl. No.: 10/409,299

(22) Filed: Apr. 8, 2003

(65) Prior Publication Data

US 2004/0007570 A1 Jan. 15, 2004

(30) Foreign Application Priority Data

Apr. 9, 2002 (EP) .............................................. 02007906

(51) Int. Cl.$^7$ ................................................. H05B 6/78
(52) U.S. Cl. ........................ 219/700; 219/757; 219/746; 219/691; 219/695; 219/745; 219/693; 219/750
(58) Field of Search ................................. 219/757, 746, 219/748–750, 691, 693, 695–697, 745, 700

(56) References Cited

U.S. PATENT DOCUMENTS 3,974,353 A * 8/1976 Goltsos ....................... 219/700
5,436,432 A * 7/1995 Cyr ............................. 219/700

* cited by examiner

Primary Examiner—Shawntina Fuqua
(74) Attorney, Agent, or Firm—Myron Greenspan, Esq.; Lackenbach Siegel LLP

(57) ABSTRACT

Trays placed in an autoclave are coupled with microwaves from microwave generators and move back and forth as they are processed to ensure even heating. The generators are placed at the side of the autoclave so each generator connects to a wave guide in the autoclave with upwardly directed decoupling openings immediately below the tray to be heated. The distance between the decoupling opening and the tray is maintained at less than one-half wavelength. The foods on the tray are heated first from below and then the heat rises. When water in the lower food layers is heated, steam forms and must pass through the cooler upper layers to escape. As it does so, it loses heat to these layers, warming them and preventing scorching on the food's surface as well as any bursting of the trays' seal.

30 Claims, 3 Drawing Sheets

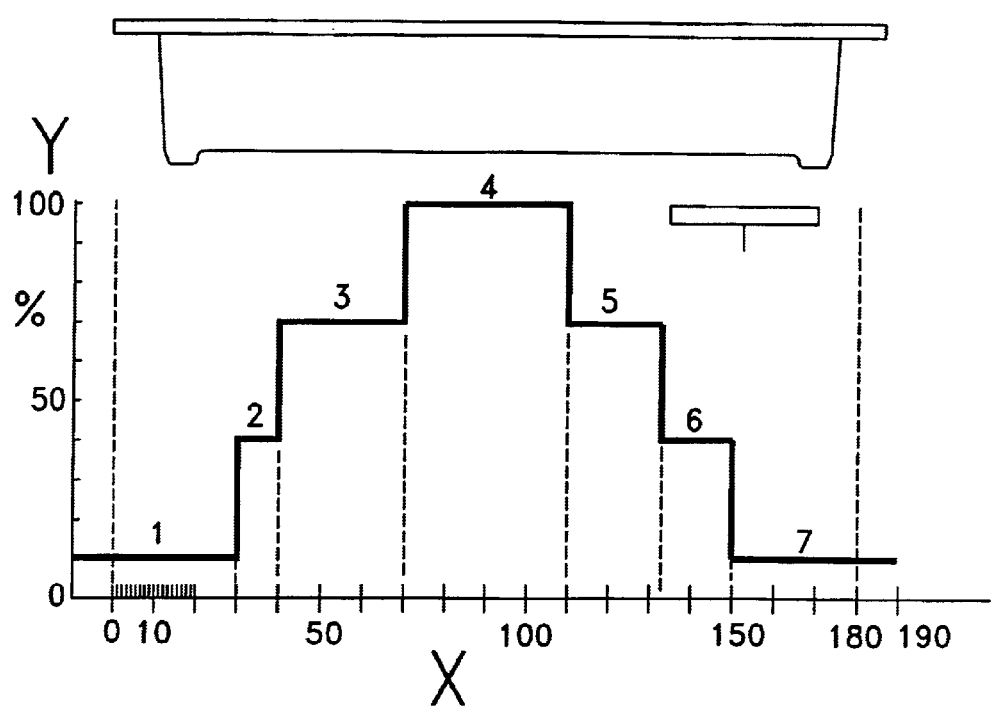

METHOD AND DEVICE FOR MICROWAVE-HEATING PREPARED MEALS SEALED IN TRAYS

BACKGROUND OF THE INVENTION

1. Field of the Invention.

The invention relates to a method and a device for microwave-heating prepared meals sealed in trays, in which the trays are placed in an autoclave into which microwaves from microwave generators are coupled in and in which the trays are moved back and forth while they are being processed.

2. Description of the Related Art.

Such a method and such a device are known from EP 0 347 623. The approach attempted in that case is to bring about the necessary heating of the foods deposited in portions on trays by diffusely filling the upper interior space of the autoclave with microwave energy, for which purpose microwave generators in the form of magnetrons are arranged around the upper half of the autoclave such that waveguides leading from the microwave generators into the autoclave are directed at the upper surfaces of the foods deposited on the trays and other waveguides are directed from the side of the autoclave with their decoupling openings confronting each other, at a relatively large distance from the undersurfaces of the trays.

In plants for the manufacture and processing of prepared meals sealed in trays, the portions deposited ready for consumption on trays and composed of meat and gravy, potatoes or noodles, and vegetables must be sterilized and/or pasteurized by heating in microwave ovens before being deep-frozen for storage. In this connection, care must be taken that these portioned, temperature-sensitive products do not exceed or fall below certain temperatures while being processed in heating systems. The microwave ovens that are used in these plants, and that usually accommodate a hundred or more trays, are equipped for this purpose with microwave generators, often hundreds of them, in the form of magnetrons.

The microwave ovens used for this purpose are autoclaves in which the pressure can be increased to such a high level that water present in the foods to be heated does not boil even at temperatures of 125° C. or more, and the tray seals, which are usually of plastic sheet, do not burst. The products disposed on a tray must be heated as evenly and steadily as possible in order to prevent overheating and burning (hot spots) at individual sites that are preferentially toward the edges, and, conversely, to prevent unheated or poorly heated sites (cold spots) in the middle, even though the energy absorption and heating characteristics of the individual products differ. For example, microwaves penetrate different products to different depths. While they have high depths of penetration in starch products such as potatoes and noodle dishes and therefore heat these foods evenly with greater speed, the depths of penetration in meat are much smaller.

The approach used to couple microwave energy into known microwave ovens is less than satisfactory. If the waveguides feeding the microwaves into the autoclave conduct the microwave energy into the autoclave from below, they are designed and arranged so that the microwaves fill the interior of the autoclave diffusely, with the objective of producing uniform heating of the material that is to be heated. This objective has not been achieved in practice. The waveguides conducting the microwave energy into the autoclave have therefore been run from the top down to immediately above the product to be heated and decoupled in that location, just above the upper surfaces of the products to be heated, with the end result that the upper surface and the headspace of the sealed tray were heated intensely and in that area the products to be heated were brought to a boil or actually caught fire and even burst the tray seal, but owing to low depths of penetration the central and lower regions were not heated satisfactorily. This is also the case when microwave energy is coupled out both below and above the products to be heated.

In addition, it was found that when diffuse filling of the interior of a microwave oven was used, the energy being coupled in tended to be extinguished by interference, so that "cold spots" kept occurring in which the products to be heated were not sterilized and pasteurized and therefore constituted a threat to human health.

From EP 0 344 408, it is known, in the microwave heating of food portions resting on trays, to keep the air temperature inside the microwave oven the same as or slightly higher than the final temperature of the foods being heated. This has proved to be inexpedient, since the outer surface of the food to be heated is raised to a higher temperature than the interior of the food. The environmental temperature of foods undergoing microwave heating can certainly be set higher than the initial [sic] temperature, but heating the outer and upper surfaces of the foods more vigorously and intensely than their interior must be avoided if at all possible.

BRIEF SUMMARY OF THE INVENTION

The invention avoids the disadvantages of the prior art. It is the object of the invention to achieve appropriate, even heating of the different products on each tray and to prevent undesirable bursting of the tray seals as well as overheating.

The invention lies in the fact that the magnetrons are disposed only at the side of the autoclave and are each connected to one waveguide that is arranged in the autoclave under the conveying device and whose decoupling openings are arranged immediately beneath the tray to be heated, at a distance of less than one-half wavelength.

What is achieved in this manner is that the foods deposited on the tray are first heated from below and the heat rises from bottom to top. This prevents overheating and burning on the surface and also eliminates the undesirable boiling of the to-be-heated products at some sites. When the water in the foods is heated to such an extent at individual sites that steam forms, then the steam has to pass through the cooler upper layers and loses its intrinsic heat as it does so by relinquishing it to these upper layers.

A frequency of 2.45 GHz is advantageously used. The distance of the decoupling openings from the underside of the tray is preferably one-third the wavelength:

It is advantageous in this connection if the microwave generators are made (modulated) to operate in pulsed mode by causing the anode current to flow in the generator when a tray compartment is over the decoupling slit and switching off the anode current when the tray leaves the space over the tray [sic] during the movement of the conveying means.

It is further advantageous if the anode current is made to flow with different intensities according to the position of the tray over the decoupling slit, preferably at the highest intensity when the tray compartment to be irradiated is located centrally over the decoupling slit.

Since, as explained hereinabove, the depths of penetration of the microwaves and the energy absorption of the different foods on one tray differ, it is advantageous if each tray is processed by means of at least two magnetrons whose waveguides are of different lengths and whose decoupling slits are arranged so as to be staggered relative to one other, so that the decoupling of the microwave energy in the amount necessary to heat each food takes place immediately beneath said food to be heated.

Since an overpressure is maintained inside the autoclave during operation, it is important that the waveguides be connected via pressure windows to the magnetron, which must operate at atmospheric pressure.

To achieve even heating of the foods, the trays rest on a conveying device, preferably a conveyor belt, which moves the trays back and forth during the heating operation so that the trays pass over plural waveguides and each tray is moved over more than one staggered pair of decoupling openings.

In such cases it is advantageous for the microwaves to be decoupled into the waveguides through slits or rows of holes.

For the system to be adaptable to different tray shapes and different geometric conditions, it is advantageous if the position of the decoupling opening can be varied by means of additional waveguide segments placed between two waveguide segments.

For the system to be adaptable to the different operating conditions for sterilization and pasteurization, it is advantageous if in the autoclave the sealed tray is subjected to a slight overpressure for pasteurization and a higher overpressure for sterilization.

For the system to be adaptable to a wide variety of requirements for heating and warming a wide variety of foods, it is advantageous to control the supply of microwave energy according to a preset program and to include for this purpose a computer-aided process control system that guides the heating operation on the basis of a presettable program and measurements made during the microwaving process.

It is advantageous to use for said control a central computer that controls the individual microwave generators via a data bus.

With this arrangement, in measuring the energy delivered by the individual microwave generators it is advantageous to determine the delivered microwave energy by measuring the time variation of the anode current (the time integral of the anode current) and to route it to a process computer for further offsetting.

To prevent overheating at the surfaces of the foods, it is advantageous for the surrounding atmosphere of the to-be-heated foods to be regulated thermostatically inside the microwave oven in such manner that it is above the initial temperature of the foods before microwave processing, but below the target final temperature of the foods.

BRIEF DESCRIPTION OF THE DRAWINGS

The nature of the invention is explained in more detail hereinbelow with reference to an exemplary embodiment depicted schematically in the drawing, wherein:

FIG. 3 is a view of a tray from above,

FIG. 4 is a side view of the tray,

FIG. 5 is a time-power graph of the microwave irradiation.

DETAILED DESCRIPTION OF THE PREFERRED EMBODIMENTS

Figure 1:
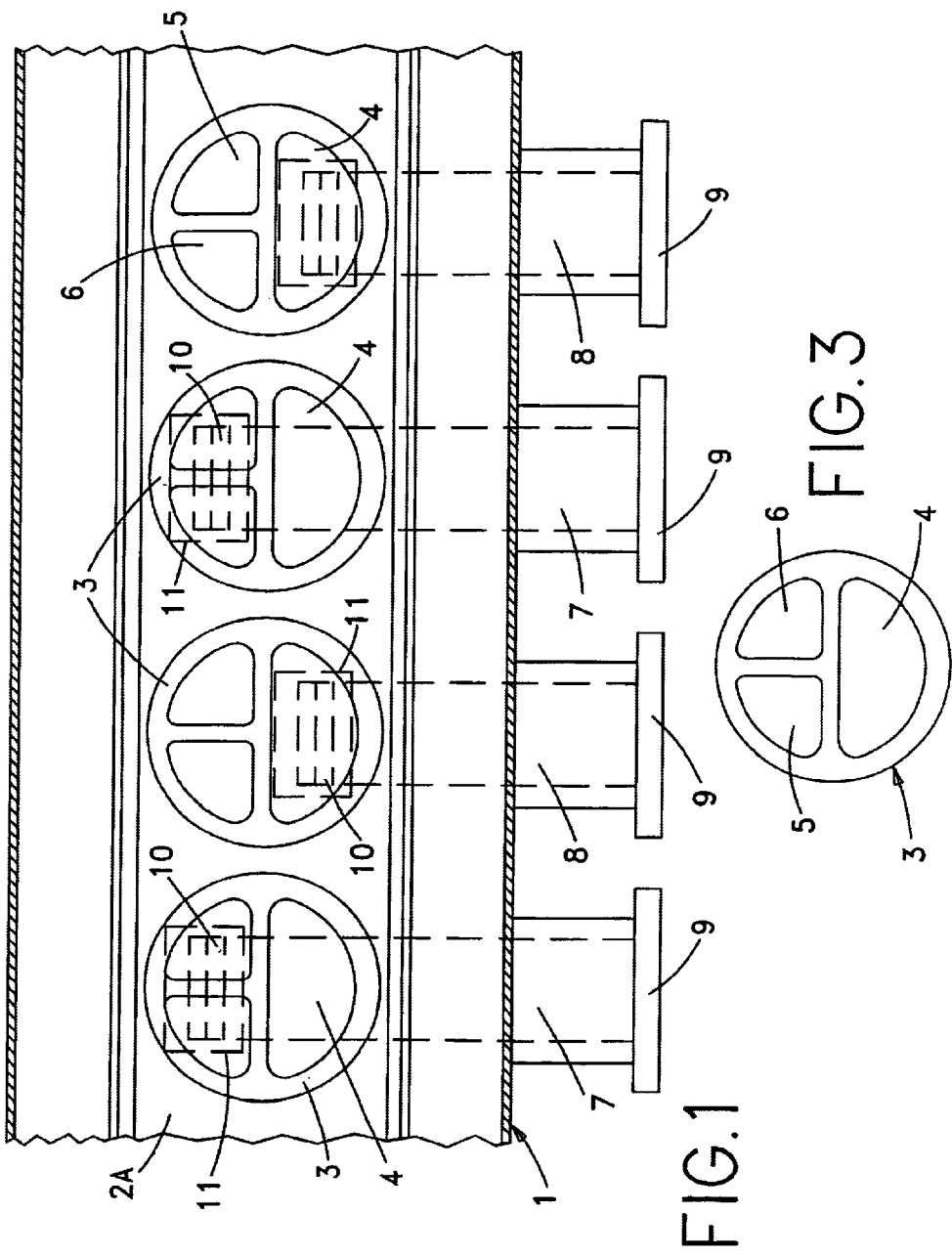
FIG. 1 is a detail of a horizontal section through the autoclave.
Figure 2:
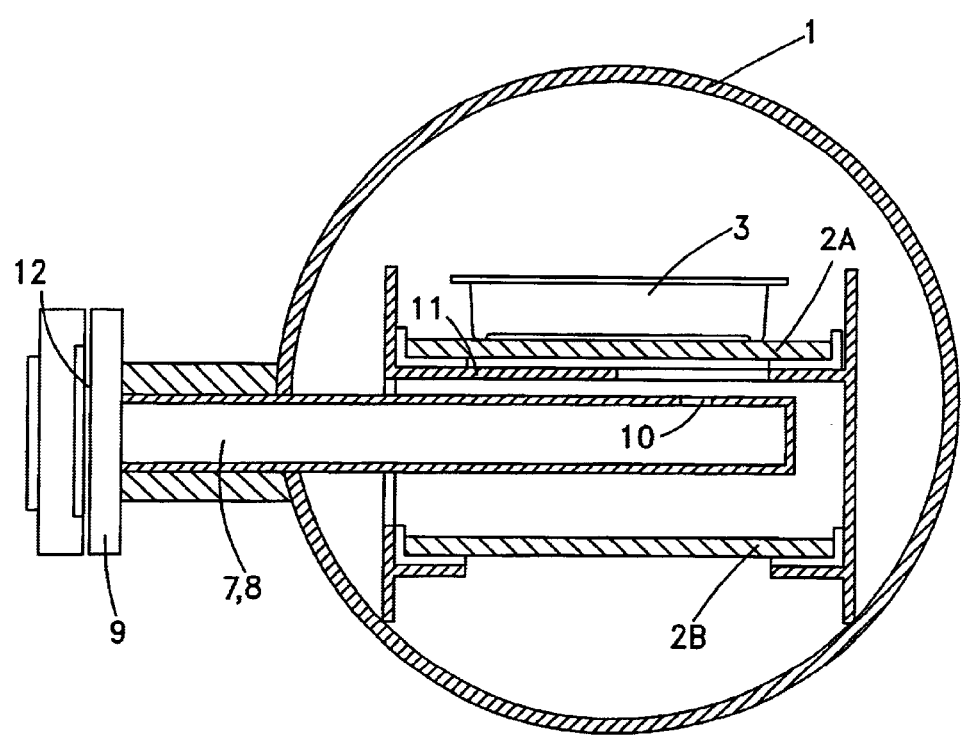
FIG. 2 is a vertical section through the autoclave.

Disposed in the tubular autoclave 1 is a conveyor belt 2 comprising top strand 2A and bottom strand 2B. Arranged on top strand 2A are trays 3 with food portions in the compartments 4, 5, 6 of the tray 3. For example, compartment 4 can contain meat and gravy, compartment 5 potatoes or noodles, and compartment 6 vegetables.

Projecting into the autoclave 1 from the side are waveguides 7, 8, to whose flanges 9 are connected microwave generators (not shown). Waveguides 7 are longer than waveguides 8. Both types of waveguides have at their ends slits 10 from which the microwaves are decoupled. The slits 10 in the long waveguides 7 can serve to heat tray compartments 4 containing meat and gravy, while slits 10 in the shorter waveguides 8 serve to heat compartments 5 and 6, containing noodles, potatoes and vegetables, of tray 3.

The slits 10 are directed upward and are arranged immediately beneath the tray 3 containing the food portions to be heated. Between the slits 10 and the trays 3 there can also be disposed shutters 11 that serve to focus the radiation into tray compartments 4, 5, 6.

The waveguides (7, 8) are connected via pressure windows (12) to the microwave generators.

A microwave power profile is plotted as a graph in FIG. 5. The x coordinate represents the path length of the distance traveled by the tray and the y coordinate the delivered energy. It will be appreciated in relation to the tray of FIG. 4 that the greatest amount of energy is delivered when the center of the tray is located over the decoupling slit and that less energy is delivered to the lateral regions of the tray when they are over the decoupling slit.

What I claim:

1. A method for microwave-heating prepared meals sealed in trays, in which the trays are placed in an autoclave into which microwaves are coupled from waveguides run only from a side of said autoclave (1) under a microwave-transparent conveying device (2A) bearing said trays (3) and in which said trays are moved within and/or through said autoclave, the method comprising the steps of:

irradiating said trays (3) with microwaves only from below;

arranging decoupling openings in said waveguides immediately beneath the trays (3) to be heated, at a distance of less than one-half wavelength therefrom;

alternating the positions of said decoupling openings between first and second positions along a direction generally transverse to the direction of movement of said conveying devise, associated with two different portions of said trays to be heated, at successive waveguides along said conveying device; and arranging said trays (3) so that each portion of each tray is irradiated only over alternate decoupling openings (10) of said waveguides (7, 8).

2. A device for microwave-heating prepared meals sealed in trays (3), comprising an autoclave (1) including a microwave transparent conveying device (2) for movement therein and designed to carry said trays (3), waveguides (7, 8) run into said autoclave (1) and fed by microwave generators, a conveying device (2) traveling therein and designed to carry said trays (3), said waveguides (7, 8) extending only from the side of said autoclave (1) under the conveying device (2A) carrying said trays (3), decoupling openings (10) for releasing the microwaves and arranging said waveguides, disposed in the upper surfaces of said waveguides (7, 8) and directed at said trays (3) and at said conveying device (2A) carrying them, said decoupling openings (10) in said waveguides (7, 8) being arranged immediately beneath the trays (3) to be heated and at a distance of less than one-half wavelength therefrom, and said decoupling openings being arranged to alternate between first and second positions along a direction generally transverse to the direction of the movement of said conveyance device, associated with two different portions of said trays to be heated, at successive waveguides along said conveying device.

3. The method as claimed in claim 1, characterized in that said trays (3) are positioned exactly in relation to said decoupling openings (10) of said waveguides (7, 8) and are then moved back and forth by exactly preset stroke lengths in accordance with a preset program, in that said microwaves are made to exit said decoupling openings (10) in plural pulses of defined and not always equal temporal length and intensity when said trays (3) during their back-and-forth movement are located above said decoupling openings (10), central regions of the tray compartments (4, 5, 6) being exposed to more microwave energy than marginal regions.

4. The method as claimed in claim 1, characterized in that each tray (3) is exposed during the microwaving process to the radiation from two microwave generators whose waveguides (7, 8) are of different lengths and whose decoupling openings (10) are arranged so as to be staggered relative to one other in such manner that they are disposed under different compartments of said tray during microwave irradiation.

5. The method as claimed in claim 1, characterized in that said waveguides (7, 8) are connected to the magnetron via pressure windows (12).

6. The method as claimed in claim 1, characterized in that said microwaves are decoupled via slits (10) directed upward at the tray underside (3).

7. The method as claimed in claim 1, characterized in that the position of said decoupling opening (10) can be varied by means of additional waveguide segments or spacers or telescoping waveguides disposed between two waveguide segments.

8. The method as claimed in claim 1, characterized in that in said autoclave (1) an overpressure adapted to the temperature evolution in said trays (3) is established and is regulated in accordance with temperature over the course of the process, the sealed tray (3) being subjected in said autoclave (1) to a slight overpressure for pasteurization and a higher overpressure for sterilization.

9. The method as claimed in claim 1, characterized in that the delivery of the microwave energy into said tray (3) is controlled in accordance with a preset, position-dependent, real-time program.

10. The method as claimed in claim 1, characterized in that used for said control is a central computer that controls the individual microwave generators via a data bus.

11. The method as claimed in claim 1, characterized in that the delivered microwave energy is determined by measuring the time variation of the anode current (the time integral of the anode current) and is routed to a process computer for further offsetting to effect process control.

12. The method as claimed in claim 1, characterized in that each tray (3) is moved over at least one staggered pair of decoupling openings (10).

13. The method as claimed in claim 1, characterized in that the surrounding atmosphere of the foods to be heated is regulated thermostatically inside the microwave oven in such manner that it is above the initial temperature of the foods before microwave treatment, but below the target final temperature of the foods.

14. The device as claimed in claim 2, characterized in that working means are provided for exactly positioning said trays (3) in relation to said decoupling openings (10) of said waveguides (7, 8), in that working means are provided to effect an exact back-and-forth movement of said conveying device, which moves said trays (3) back and forth by preset stroke lengths with millimeter precision according to a preset program, in that a control apparatus is provided that causes the microwaves to exit said decoupling openings (10) in plural pulses of defined and not always equal temporal length and intensity when said trays (3) during their back-and-forth movement are located above said decoupling openings, central regions of said tray compartments (4, 5, 6) being exposed to more microwave energy than marginal regions.

15. The device as claimed in claim 2, characterized in that said microwave-generating microwave generators are disposed only at one side of said autoclave (1) and are each connected to one waveguide (7, 8) disposed at said side of said autoclave (1) and run thereinto, and comprising at least one decoupling opening (10) for the microwaves immediately beneath the tray (3) to be heated and at a distance of less than one-half wavelength therefrom.

16. The device as claimed in claim 2, characterized in that assigned to each tray (3) is at least one pair of microwave generators whose waveguides (7, 8) are of different lengths and whose decoupling slits (1) are staggered relative to one other.

17. The device as claimed in claim 2, characterized in that said waveguides (7, 8) are connected to said microwave generators via pressure windows (12).

18. The device as claimed in claim 2, characterized in that the positions of said decoupling openings (10) with respect to said conveying device (2) and said trays (3) can be varied by means of additional waveguide segments disposed between two waveguide segments.

19. The device as claimed in claim 2, characterized in that the delivery of the microwave energy is controlled according to a preset, real-time program.

20. The device as claimed in claim 2, characterized in that used for said control is a central computer that controls the individual microwave generators via at least one data bus.

21. The device as claimed in claim 2, characterized in that provided in the system is a process computer for heating the trays, which calculates the delivered microwave energy by measuring the time variation of the anode current (the time integral of the anode current) and determines according to a preset program the anode currents that are to be delivered to the individual microwave generators.

22. The device as claimed in claim 20, characterized in that said microwave generators operate in clock and/or pulsed mode, the anode current in said generator (1) being switched on when a tray compartment is located over said decoupling slit (10), and the anode current being switched off when said tray (3) leaves the space above said decoupling slit during the movement of said conveying means, or the anode current in said generator (1) being switched on completely or at a given intensity when a tray compartment is located over said decoupling slit (10), and the anode current being turned down to a basic power of preferably 10% of full power when said tray (3) leaves the space above said decoupling slit during the movement of said conveying means.

23. The device as claimed in claim 20, characterized in that the anode current flows with different intensities according to the position of said tray (3) over said decoupling slit (10), preferably at the highest intensity when the tray compartment (4, 5, 6) to be irradiated is located centrally over said decoupling slit (10).

24. The device as claimed in claim 2, characterized in that each tray (3) is moved over more than one staggered pair of decoupling openings (10) during said microwaving process.

25. The device as claimed in claim 2, characterized in that the spacing between said trays (3) on said conveying device exactly matches the spacing between said waveguide pairs (7, 8).

26. The device as claimed in claim 2, characterized in that the spacing between said trays (3) on said conveying device is uniform.

27. The device as claimed in claim 2, characterized in that said trays (3) are all positioned in the same angular position on said conveying device.

28. The method as claimed in claim 1, characterized in that the anode current in the microwave generator is made to flow with different intensities according to the position of said tray (3) over said decoupling slit (10), preferably at the highest intensity when the tray compartment (4, 5, 6) to be irradiated is located centrally over said decoupling slit.

29. The method as claimed in claim 3, characterized in that the anode current in the microwave generator is made to flow with different intensities according to the position of said tray (3) over said decoupling slit (1), preferably at the highest intensity when the tray compartment (4, 5, 6) to be irradiated is located centrally over said decoupling slit.

30. The method as claimed in claim 1, characterized in that the position of said decoupling opening (10) can be varied by means of additional waveguide segments or spacers or telescoping waveguide disposed between two wavelength segments.

* * * * *